(No Model.)
J. DES BRISAY.
VALVE FOR ENGINES.
No. 390,460. Patented Oct. 2, 1888.
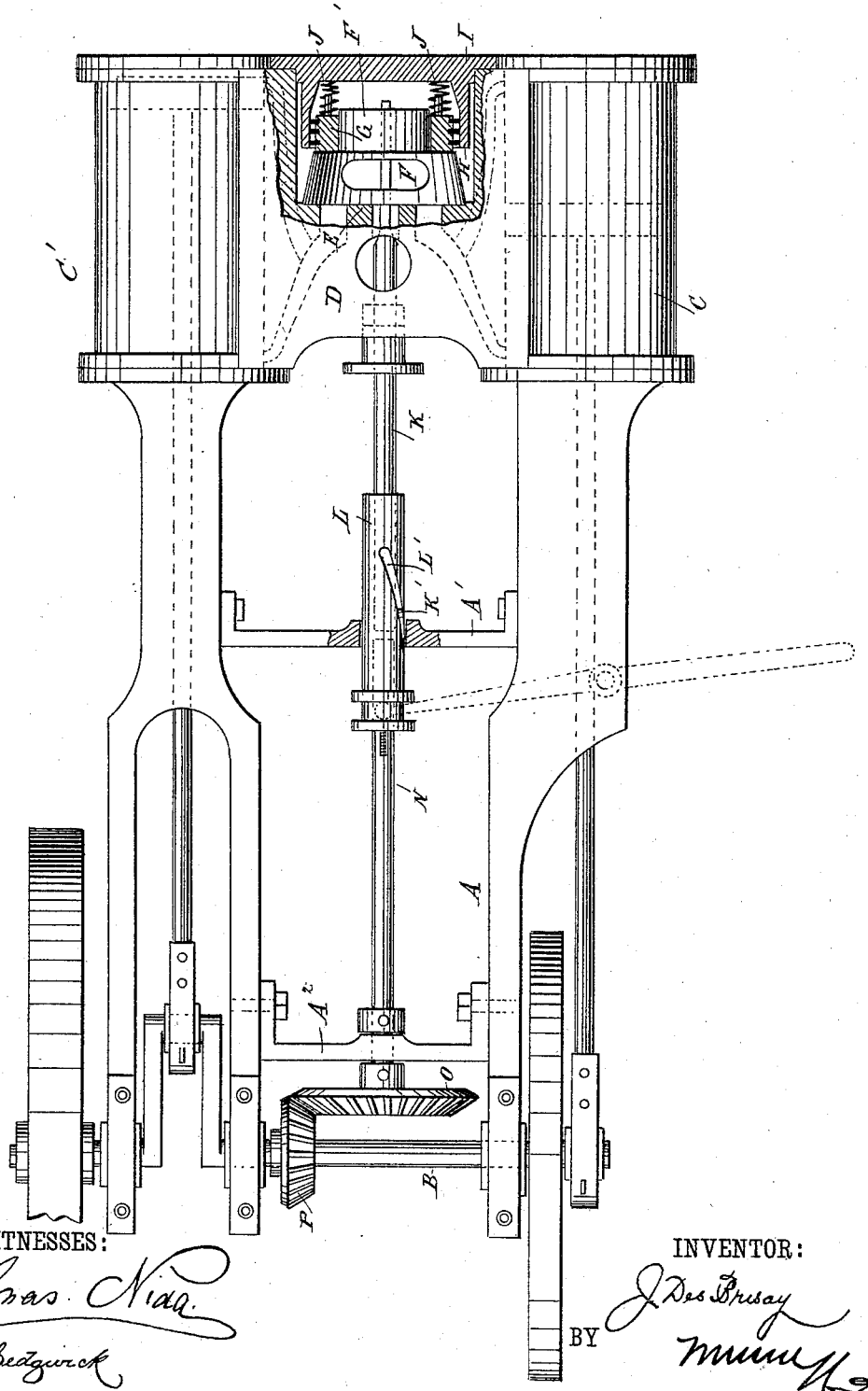

UNITED STATES PATENT OFFICE.

JAMES DES BRISAY, OF KAMLOOPS, BRITISH COLUMBIA, CANADA.

VALVE FOR ENGINES.

SPECIFICATION forming part of Letters Patent No. 390,460, dated October 2, 1888

Application filed September 7, 1887. Serial No. 249,010. (No model.)

*To all whom it may concern:*

Be it known that I, JAMES DES BRISAY, of Kamloops, in the Province of British Columbia and Dominion of Canada, have invented a new and Improved Valve for Steam-Engines, of which the following is a full, clear, and exact description.

My invention relates to a valve for steam-engines for which I filed an application for Letters Patent of the United States on the 2d day of August, 1887, Serial No. 245,923.

The invention consists in the construction and arrangement of various parts and details and combinations of the same, as will be fully described hereinafter, and then pointed out in the claims.

Reference is to be had to the accompanying drawing, forming a part of this specification, in which the figure illustrates a plan view of my improvement with parts in section.

On a suitably-constructed frame, A, is mounted the main shaft B, connected in the usual manner by crank-arms and pitmen with the cylinders C and C', connected with each other by a saddle, D, having a valve-seat, E, on which is held to rotate the valve F, of precisely the same construction as shown and described in my application above referred to. On the valve F is formed a concentric offset, F', on which is loosely held a ring, G, adapted to slide in a cylinder, H, formed in the interior of the cylinder-head cover I, and on the said ring G rest the springs J, so as to hold the valve F on its seat E.

The valve F is fastened onto one end of a shaft, K, which passes through the saddle D, and is provided near its outer end with a pin, K', fitting into a spiral groove, L', formed in the sleeve L, and having its bearing in a cross-piece, A', secured to the main frame A. The sleeve L is adapted to turn with and to slide upon one end of a shaft, N, which has its bearing in a cross-piece, A², secured to the main frame A near the main shaft B.

On the outer end of the shaft N is secured a large bevel gear-wheel, O, which meshes into the bevel gear-wheel P, fastened on the main shaft B. The bevel gear-wheel O is double the size of the bevel gear-wheel P, so that the main shaft B has to make two revolutions in order to impart one revolution to the shaft N.

Suitable means are employed to impart a forward and backward motion to the sleeve L, and the said means may consist of a common forked lever engaging an annular groove on the said sleeve, as shown in dotted lines in the drawing.

The operation is as follows: The valve F operates over the ports leading to the cylinders C and C' in the same manner as shown and described in my application for Letters Patent above referred to. The said valve is held on its seat by the springs J, thus insuring a safe passage of the steam from the said valve to the cylinders, and vice versa. The rotary motion of the main shaft B is transmitted to the shaft N, and the latter, by means of the sleeve L and the pin K', imparts a rotary motion to the shaft K, so that the valve F is rotated over its ports in the saddle D. Thus it will be seen that the said valve F is operated directly from the main shaft B.

When the operator desires to reverse the engine, he moves the sleeve L forward, so that the spiral groove L' in the sleeve L, acting on the pin K', causes the shaft K to turn one-quarter of a revolution, whereby the relative position of the ports in the valve F and the saddle D is changed, thus reversing the engine.

Having thus fully described my invention, I claim as new and desire to secure by Letters Patent—

1. In a valve-gear for steam-engines, the combination, with a valve adapted to rotate on its seat and having a concentric projection, of a ring held on the said concentric projection and pressing against the said valve, substantially as shown and described.

2. The combination, in an engine, with the saddle D, its valve-seat E, and the cover I, having the cylinder H on its inner face, of the valve F, having a concentric projection, F', of less diameter on its rear face, the ring G, sliding in the tube H and on the projection F' against the valve, and the springs J, interposed between cover I and ring G, substantially as set forth.

JAMES DES BRISAY.

Witnesses:
 DUGAL MCKENZIE,
 ROBERT MEE.